W. G. DUNN.
GEAR SHIFTING MECHANISM FOR MOTOR CARS.
APPLICATION FILED MAY 6, 1918.
1,285,076.
Patented Nov. 19, 1918.
3 SHEETS—SHEET 1.
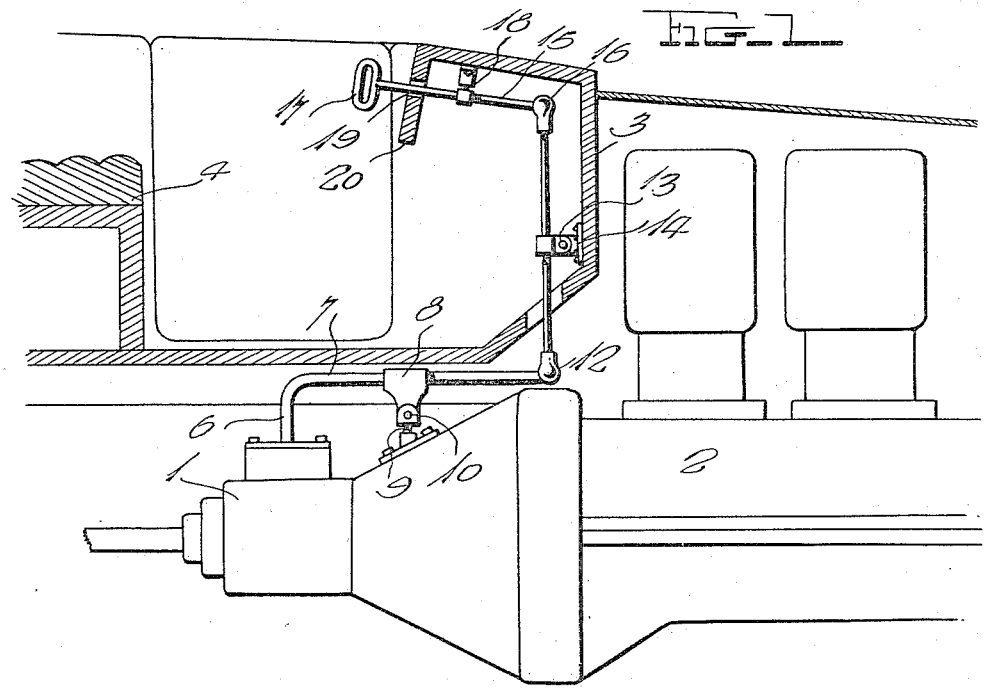
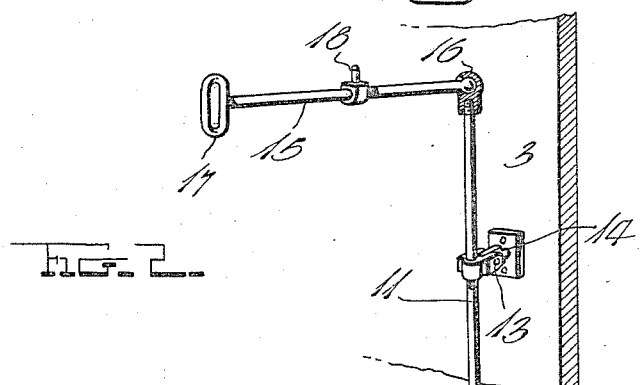
Witness
H. Woodard
Inventor
W. G. Dunn
By H. B. Wilson & Co.
Attorneys W. G. DUNN.
GEAR SHIFTING MECHANISM FOR MOTOR CARS.
APPLICATION FILED MAY 6, 1918.
1,285,076.
Patented Nov. 19, 1918.
3 SHEETS—SHEET 2.
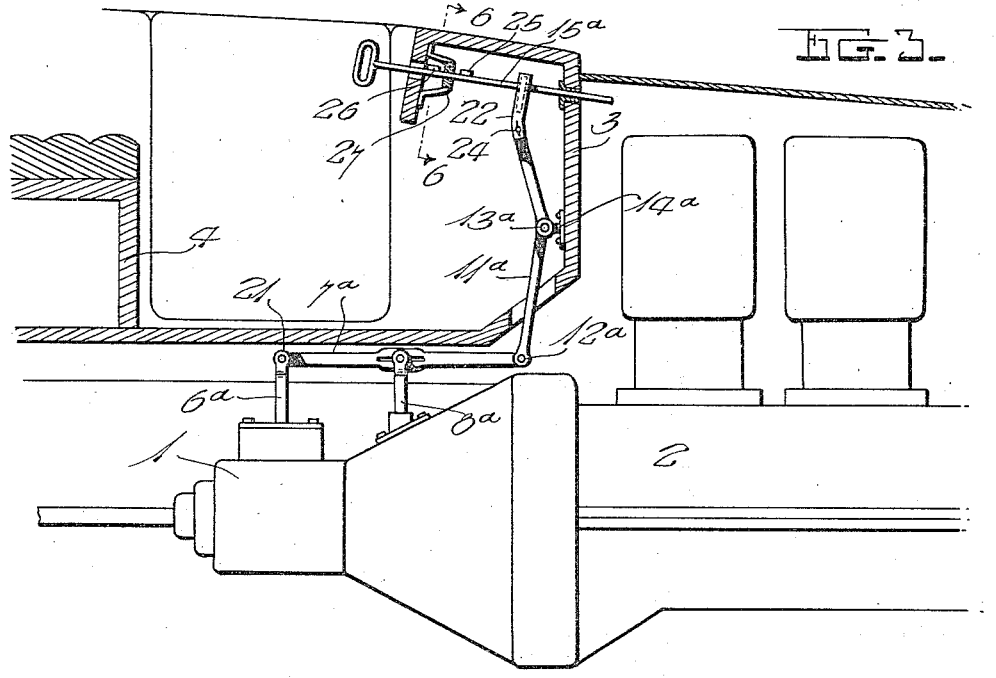
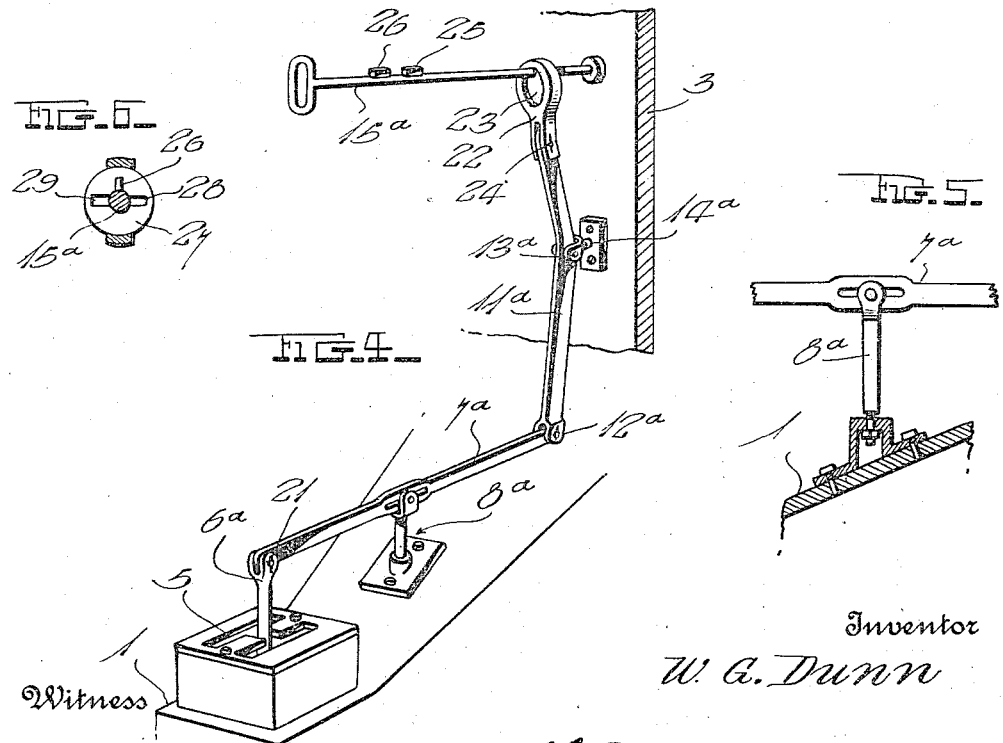
Witness
H. Woodard
Inventor
W. G. Dunn
By H. B. Willson &co.
Attorneys

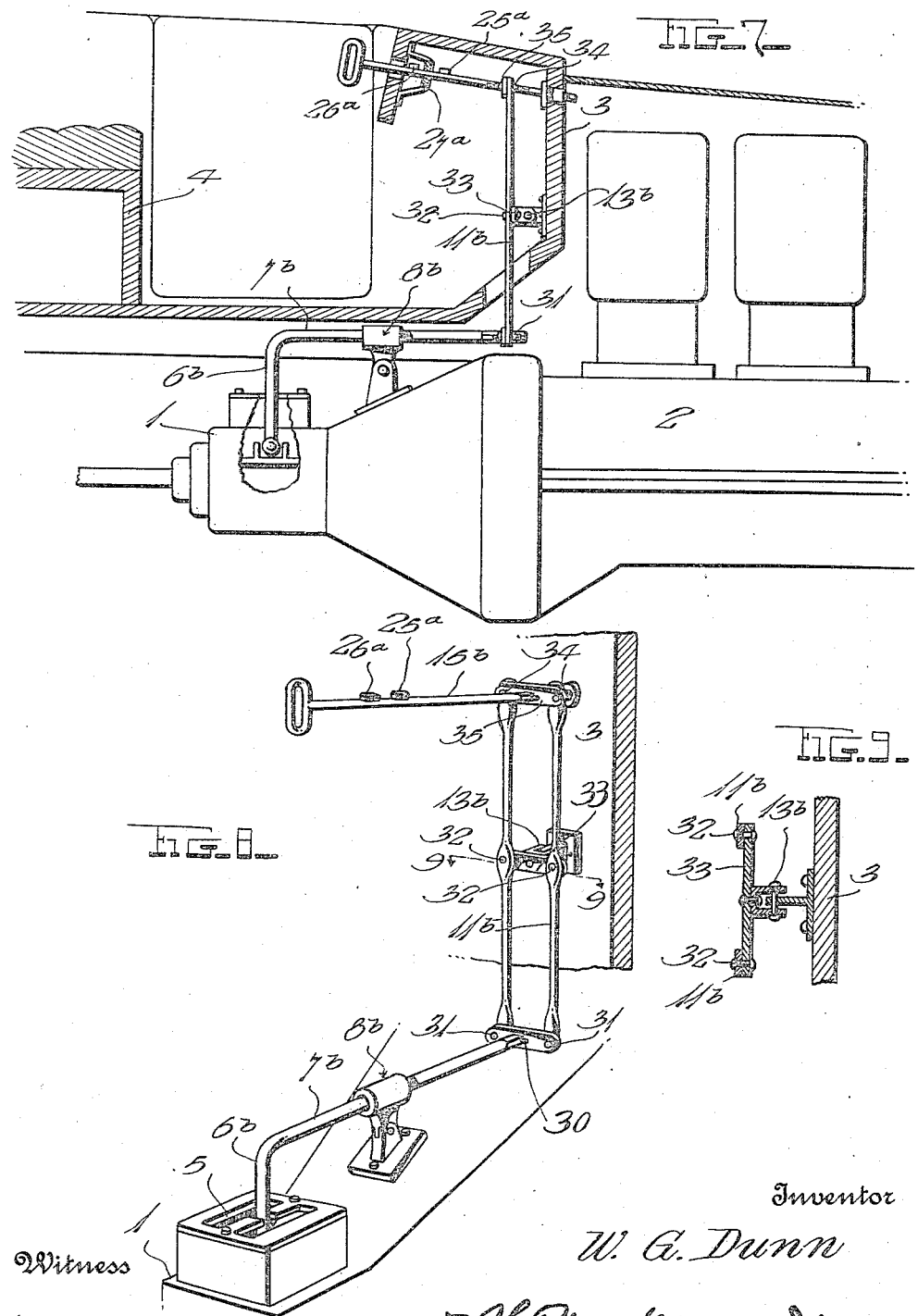

UNITED STATES PATENT OFFICE.

WILLIAM G. DUNN, OF CLARINDA, IOWA.

GEAR-SHIFTING MECHANISM FOR MOTOR-CARS.

1,285,076.  Specification of Letters Patent. Patented Nov. 19, 1918.

Application filed May 6, 1918. Serial No. 232,864.

*To all whom it may concern:*

Be it known that I, WILLIAM G. DUNN, a citizen of the United States, residing at Clarinda, in the county of Page and State of Iowa, have invented certain new and useful Improvements in Gear-Shifting Mechanism for Motor-Cars; and I do declare the following to be a full, clear, and exact description of the invention, such as will enable others skilled in the art to which it appertains to make and use the same.

My invention has for its principal object to provide an extremely simple, yet a highly efficient and desirable mechanism for shifting the variable speed transmission gears of motor cars without the necessity of locating a hand lever or the like at the floor of the machine, thus permitting the front passenger compartment to be free of obstructions. By this means, also, the control for shifting the gears may be located in more easy reach of the driver, preferably adjacent the dash or the steering post.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a longitudinal section of a portion of an automobile showing the application of one form of my invention;

Fig. 2 is a perspective view of the gear shifting mechanism shown in Fig. 1;

Fig. 3 is a duplicate of Fig. 2 with the exception that it illustrates a different form of construction;

Fig. 4 is a perspective view of the mechanism shown in Fig. 3;

Fig. 5 is a detail vertical section showing more particularly the manner of mounting the bearing member on which one of the levers of the mechanism is supported;

Fig. 6 is a detail transverse section on the plane indicated by the line 6—6 of Fig. 3;

Fig. 7 is a view similar to Figs. 1 and 3 showing a third form of the invention;

Fig. 8 is a perspective view of the mechanism shown in Fig. 7; and

Fig. 9 is a detail horizontal section on the plane of the line 9—9 of Fig. 8.

In the drawings above briefly described, the numeral 1 designates the transmission casing of an automobile, said casing being directly associated with the engine 2 in the well known manner common to machines employing a unit power plant. The motor 2 is located in advance of a cowl dash 3 and in rear of this dash the front seat of the machine is indicated at 4. Heretofore, a lever has commonly been employed rising from the transmission casing 1 through the floor of the machine for shifting the transmission gearing into first, second, third and reverse, but since this lever offers considerable obstruction to easy entrance and egress, it is highly advantageous to provide a mechanism which will render the use of such a lever unnecessary. This end is attained by the present invention, and although I have shown the same applied to the transmission casing 1 associated directly with the motor, it is to be understood that the improved gear shifting means is equally adaptable to other forms of machines in which the transmission is located otherwise. Also, regardless of the fact that the invention is illustrated applied to a transmisison casing having an H slot 5, it is equally adaptable to those employing no such slot. In the form of the invention shown in Figs. 1 and 2, a gear shifting arm 6 rises from the transmission casing 1 through the slot 5 and is by preference connected integrally with the rear end of a forwardly and rearwardly slidable, and horizontally swinging bar 7 which is in effect a lever. Bar 7 is supported at a suitable point by a bearing member 8 capable of turning horizontally on a vertical axis 9 and swinging vertically to a slight extent on a horizontal axis 10. It is intended that bar 7 shall be swung laterally and then shifted longitudinally as required to shift the gear into first, second, third and reverse as necessary. In the present showing, the arm is moved to the left and rearwardly for first, to the right and forwardly for second, straight back from second to third, and to the left and forwardly for reverse, but it will be obvious that the improved shifting mechanism is also readily adaptable to transmission gears in which the shifting arm such as 6 is moved in other ways.

The bar 7 extends forwardly from the arm 6 and a vertically disposed, forwardly, rearwardly, and laterally swinging lever 11 rises from the front end of said bar 8 adjacent the dash 3, a ball joint 12 being preferably employed for operatively connecting said bar and lever. At a suitable point between its ends, lever 11 is fulcrumed for forward and rearward swinging on a transverse axis 13 and for lateral swinging on a longitudinal axis 14, the terms "longitudinal" and "transverse" being used with reference to the automobile as a whole.

For actuating the lever 11 in the required manner, a control rod 15 extends rearwardly from the upper end thereof and is by preference connected thereto by a ball joint 16, the rear end of said rod 15 having a suitable hand grip 17, while between its ends, the rod in question is pivotally mounted at 18 for turning or swinging in a horizontal direction.

To operate the form of gear shifting mechanism so far described, it is only necessary to shift the hand grip 17 to the right or left as occasion may demand and then force the same forwardly or rearwardly, according to the gearing to be thrown into play. By means of the levers 11 and 7 and their connections with each other and the rod 15, the motion of the hand grip is transmitted to the arm 6 so that the latter may be moved to shift any desired gear set into operation. Obviously the pivot 9 comes into play when the lever 7 is swung horizontally, and when lever 11 is swung forwardly or rearwardly, the ball joint 12 slightly raises or lowers the front end of said lever 7, the pivot 10 being then instrumental in permitting this motion.

Preferably though not necessarily, the support 8 is mounted on top of the unit power plant as shown, the fulcrum of the lever 11 is mounted on the dash 3, and the control rod 15 extends through a slot 19 in the instrument board 20, but it is to be understood that other arrangements could well be employed, and it may here be specifically stated that although the lever 11 is shown in rear of the dash 3, it may in some cases be much more desirable to dispose the same in advance of said dash, beneath the engine hood. Such an arrangement lies clearly within the scope of the invention but need not be illustrated.

In Figs. 3, 4, 5 and 6, a slightly different form of the invention is shown. In these figures, the gear shifting arm $6^a$ is formed separately from the longitudinal bar or lever $7^a$ and is connected thereto at 21, the supporting means $8^a$ of the lever $7^a$ being also slightly different from that illustrated in Figs. 1 and 2. Both showings however are for illustrative purposes and it is to be understood that any adequate construction could be employed for permitting the necessary movement of the lever. At $12^a$, the lower end of a vertical lever $11^a$ is pivotally and by preference slidably connected to the front end of lever $7^a$, said lever $11^a$ being fulcrumed at $13^a$ for forward and rearward movement, and at $14^a$ for lateral tilting.

The upper end of lever $11^a$ is provided with an eccentric band 22 containing an eccentric 23. The eccentric 23 is secured on the front end of a longitudinal control rod $15^a$ which in this instance turns by rotary movement instead of lateral swinging. It will be obvious that turning of the rod $15^a$ will cause the eccentric 23 to shift lever $11^a$ laterally to cause lever $7^a$ to correspondingly move the arm $6^a$, and that forward or rearward sliding of said rod will cause the several connections to correspondingly shift said arm. Since the eccentric band 22 must move vertically as the eccentric is turned therein, it is shown slidably connected at 24 to the lever $11^a$, but if other ways are preferred for obtaining the required results, they may well be substituted for this sliding arrangement.

Rod $15^a$ is preferably provided with front and rear lugs 25 and 26 and when the gears are in neutral, said lugs are disposed on opposite sides of a plate or guide 27 through which the rod slides. This guide 27 is provided with a pair of notches 28 and 29 and in order to shift the control rod $15^a$ forwardly or rearwardly as occasion may demand, it is necessary to turn the same until the lugs and notches are in line. Otherwise the shaft cannot be so shifted. By this means therefore, proper movement of the control rod is insured.

In the form of the invention shown in Figs. 7, 8 and 9, the essential elements are the same as in the types above described, but radical departures are made from these types in the way of structure. In this form of the shifting mechanism, the gear shifting arm $6^b$ is connected integrally or in any other preferred manner with the rear end of a longitudinal bar $7^b$, and this bar turns by a rocking or rotating action rather than horizontal swinging as above set forth, the support $8^b$ for said bar being suitably constructed for permitting the required movement. At its front end, bar $7^b$ is provided with a cross arm 30 to which a pair of parallel vertical levers $11^b$ are pivoted at 31. At 32 the intermediate portions of the levers $11^b$ are secured to a cross arm 33 which is pivotally mounted at $13^b$ to permit forward and rearward swinging of the two levers. The upper ends of these levers are pivoted at 34 to the ends of a cross arm 35 on the front end of a control rod $15^b$. This rod is suitably mounted for turning or rocking motion and for forward and rearward movement, and is preferably equipped with lugs $25^a$ and $26^a$ coacting with slots in a guide $27^a$, these features operating in the same manner as those above described.

In actuating the arrangement shown in Figs. 7, 8 and 9, rotation of shaft $15^b$ to the proper extent transmits a similar motion to bar $7^b$ by way of the connecting levers $11^b$ thus swinging the arm $6^b$ in one direction or the other as occasion may demand. A forward or rearward motion of rod 15$^b$ will then be transmitted to said arm 6$^b$ by the levers 11$^b$ and bar 7$^b$.

From the foregoing, taken in connection with the accompanying drawings, it will be obvious that although the several forms of my invention are of comparatively simple nature, they will be highly desirable since they eliminate the need of locating the lever on the floor of the machine for shifting gears. Since probably the best results are obtained from the several features shown and described, they will by preference be followed, but within the scope of the invention as claimed, considerable latitude is allowed for development, particularly for the adaptation of the gear shifting mechanism to different makes of machines.

I claim:

1. In combination with the laterally, forwardly, and rearwardly movable gear shifting arm of a motor car, a forwardly extending bar connected to said arm for shifting it laterally when said bar is turned and for shifting said arm forwardly and rearwardly when the bar is moved correspondingly, a vertical lever connected to and rising from said bar for turning or shifting it forwardly or rearwardly as required, and a rearwardly extending control rod connected to the upper end of said lever for actuating the latter.

2. In combination with the laterally, forwardly, and rearwardly movable gear shifting arm of a motor car, and the power unit casing into which it extends; a support rising from said casing in advance of said arm, a forwardly extending bar connected to said arm and mounted between its ends on said support for forward sliding to correspondingly move said arm, and for turning to shift said arm laterally, a vertical lever connected to and rising from the front end of said bar for sliding or turning it as required, a support to which said lever is fulcrumed between its ends, and a rearwardly extending control rod connected to the upper end of said lever for actuating the latter.

3. In combination with the laterally, forwardly and rearwardly movable gear shifting arm of a motor car, and the power unit casing into which it extends; a support rising from said casing in advance of said arm, a forwardly extending bar connected to said arm and mounted between its ends on said support for forward sliding to correspondingly move said arm, and for turning to shift said arm laterally, a vertical lever connected to and rising from the front end of said bar for sliding or turning it as required, a support to which said lever is fulcrumed between its ends, and a rearwardly extending control rod connected to the upper end of said lever for actuating the latter, said rod turning to actuate said lever and bar for shifting said arm laterally, and moving forwardly or rearwardly to correspondingly move said arm.

4. In combination with the laterally, forwardly, and rearwardly movable gear shifting arm of a motor car, a forwardly extending, horizontally swinging and longitudinally sliding lever connected to said arm for shifting the same as required, a vertically disposed, forwardly, rearwardly and laterally swinging lever, rising from the front end of and connected to said horizontal lever for operating the latter, and a rearwardly extending control rod connected to the upper end of said vertical lever for swinging the same in the required directions.

5. In combination with the laterally, forwardly, and rearwardly movable gear shifting arm of a motor car, a forwardly extending, horizontally swinging, and longitudinally sliding lever connected to said arm for shifting the same as required, a vertically disposed, forwardly, rearwardly and laterally swinging lever, rising from the front end of and connected to said horizontal lever for operating the latter, said control rod turning to move the two levers for shifting said arm laterally and moving longitudinally for shifting said arm forwardly or rearwardly.

6. In combination with the laterally, forwardly and rearwardly movable gear shifting arm of a motor car, a forwardly extending longitudinally sliding lever connected to said arm for shifting the same as required, a vertically disposed, forwardly, rearwardly and laterally swinging lever rising from the front end of said first named lever, a ball joint connecting the two levers, a longitudinally slidable, laterally swinging control lever extending rearwardly from the upper end of said vertically disposed lever, and a ball joint connecting said vertically disposed lever and said control lever.

In testimony whereof I have hereunto set my hand.

WILLIAM G. DUNN.